(12) United States Patent
Radmard et al.

(10) Patent No.: US 7,626,748 B2
(45) Date of Patent: *Dec. 1, 2009

(54) GEL POLYMERS CONTAINING IONIC LIQUIDS

(76) Inventors: Bijan Radmard, 255 North Rd., Unit 101, Chelmsford, MA (US) 01824; Gregory A. Sotzing, 144 Hillyndale Rd., Storrs, CT (US) 06268

(*) Notice: Subject to any disclaimer, the term of this patent is extended or adjusted under 35 U.S.C. 154(b) by 228 days.

This patent is subject to a terminal disclaimer.

(21) Appl. No.: 11/365,125

(22) Filed: Mar. 1, 2006

(65) Prior Publication Data

US 2006/0203322 A1 Sep. 14, 2006

Related U.S. Application Data

(60) Provisional application No. 60/657,604, filed on Mar. 1, 2005, provisional application No. 60/664,651, filed on Mar. 23, 2005.

(51) Int. Cl.
*G02F 1/15* (2006.01)
*G09G 3/19* (2006.01)
*H04N 9/24* (2006.01)

(52) U.S. Cl. ............ 359/265; 345/49; 348/814
(58) Field of Classification Search ......... 359/247, 359/252–254, 265–275; 345/49, 105; 348/814
See application file for complete search history.

(56) References Cited

U.S. PATENT DOCUMENTS

| | | | | |
|---|---|---|---|---|
| 5,471,338 A * | 11/1995 | Yu et al. | ............ | 359/273 |
| 6,214,251 B1 * | 4/2001 | Wu et al. | ............ | 252/62.2 |
| 6,403,741 B1 * | 6/2002 | Heuer et al. | ............ | 526/256 |
| 6,791,738 B2 | 9/2004 | Reynolds et al. | | |
| 2002/0110739 A1 * | 8/2002 | McEwen et al. | ............ | 429/324 |

OTHER PUBLICATIONS

Argun et al., Multicolored Electrochromism in Polymers: Structures and Devices, 2004, Chem. Mater. Reviews 12(23):4401-4412.
Granquist, Electrochromic tungsten oxide films: Review of progress 1993-1998, 2000, Solar Energy Materials and Solar Cells 60:201-262.
Hyodo, Electrochromism of Conducting Polymers, 1994, Electrochimica Acta 39(2):265-272.
Mortimer, Organic electrochromic materials, 1999, Electrochimica Acta 44:2971-2981.
Rosseinsky et al., Electrochromic Systems and the Prospects for Devices, 2001, J. Adv. Mater. 13(11):783-793.

(Continued)

*Primary Examiner*—Scott J Sugarman
*Assistant Examiner*—Dawayne A Pinkney

(57) ABSTRACT

An electrochromic cell of the present invention may include a first electrically conducting transparent electrode bonded to an electrochemically formed first electrochromic electrode on the surface of the electrode; a second electrically conducting transparent electrode bonded to an electrochemically formed second electrochromic electrode on the surface of the second electrode and a transparent gel polymer electrolyte formed from one or more macromonomers mixed with a plasticizer and an electrolyte salt, the gel polymer containing ionic liquids in contact with both the first and second electrochromic electrodes; the first and second electrochromic electrodes are separated from each other.

33 Claims, 11 Drawing Sheets
(6 of 11 Drawing Sheet(s) Filed in Color)

OTHER PUBLICATIONS

Somani et al., Electrochromic materials and devices: present and future, 2003, Mater. Chem. and Phys. 77:117-133.

Sapp et al., Rapid Switching Solid Stare Electrochromic Devices Based on Complementary Conducting Polymer Films, 1996, Adv. Mater. 8(10):808-811.

Sapp et al., High Contrast Ratio and Fast-Switching Dual Polymer Electrochromic Devices, 1998, Chem. Mater. 10:2101-2108.

Ribeiro et al., Solid-state electrochromic device based on two poly(thiophene) derivatives, 2004, J. Electronal. Chem. 567:243-248.

Rocco et al., An Electrochromic Device Combining Polypyrrole and $WO_3$ -I. Liquid Electrolyte, 1996, Electrochimica Acta 41(18):2805-2816.

Gustafsson-Carlberg et al., Tuning the Bandgap for Polymeric Smart Windows and Displays, 1995, Electrochimica Acta 40(13):2233-2235.

Rauh, Electrochromic windows: an overview, 1999, Electrochimica Acta 44:3165-3176.

Judd et al., Color in Business, Science and Industry, John Wiley & Sons, New York 1967 (TOC).

Wyszecki et al., Color Science: Concepts and Methods, Quantitative Data and Formulae, John Wiley & Sons, New York, 1982 (TOC).

Agnihotry et al., PMMA based gel electrolyte for EC smart windows, 1999, Electrochimica Acta 44:3121-3126.

Byker, Electrochromics and polymers, 2001, Electrochimica Acta 46:2015-2022.

Georen et al., Characterisation and modeling of the transport properties in lithium battery gel electrolytes: Part I. The ninary electrolyte $PC/LiClO_4$, 2004, Electrochimica Acta 49:3497-3505.

Sekhon et al., Solvent effect on gel electrolytes containing lithium salts, 2000, Solid State Ionics 136:1189-1192.

Dias et al., Trends in polymer electrolytes for secondary lithium batteries, 2000, J. Power Sources 88:169-191.

Gazotti et al., Polymer electrolytes based on ethylene oxide-epichlorohydrin copolymers, 2000, Solid State Ionics 130:281-291.

Meyer, Polymer Electrolytes for Lithium-Ion Batteries, 1998, Adv. Mater. 10(6):439-448.

Song et al., Characterization of UV-cured gel polymer electrolytes for rechargeable lithium batteries, 2002, J. Power Sources 110:209-215.

Heuer et al., Electrochromic Window Based on Conducting Poly (3,4-ethylenedioxythiophene)- Poly(styrene sulfonate), 2002, Adv. Funct. Mater. 12(2):89-94.

Sotzing et al., Multiply Colored Electrochromic Carbazole-Based Polymers, 1997, Chem. Mater. 9:1578-1587.

Argun et al., The First Truly All-Polymer Electrochromic Devices, 2003, Adv. Mater. 15(15):1338-1341.

Delongchamp et al., Layer-by-Layer Assembly of PEDOT/ Polyaniline Electrochromic Devices, 2001, Adv. Mater. 13(19):1455-1459.

Ko et al., Characteristics of dual-type electrochromic device based on poly(3-tetradecylthiophene) and poly(3,4-ethylenedioxythiophene), 2004, Synth. Met. 143:31-35.

Grande et al., Intrinsic Asymmetry, Hysteresis, and Conformational Relaxation during Redox Switching in Polypyrrole: A Coulovoltametric Study, 1998, J. Phys. Chem. B 102:7535-7540.

Otero et al., Reinterpretation of Polypyrrole Electrochemistry after Consideration of Conformational Relaxation Processes, 1997, J. Phys. Chem. B. 101:3688-3697.

Otero et al., UV-Visible Spectroelectrochemistry of Conducting Polymers. Energy Linked to Conformational Changes, 1999, Langmuir 15:1323-1327.

Obrien et al., Electrochromic coatings-applications and manufacturing issues, 1999, Thin Solid Films 345:312-318.

Heckner et al., Similarities between electrochromic windows and thin film batteries, 2002, Solid State Ionics 152:899-905.

\* cited by examiner

Fig. 3
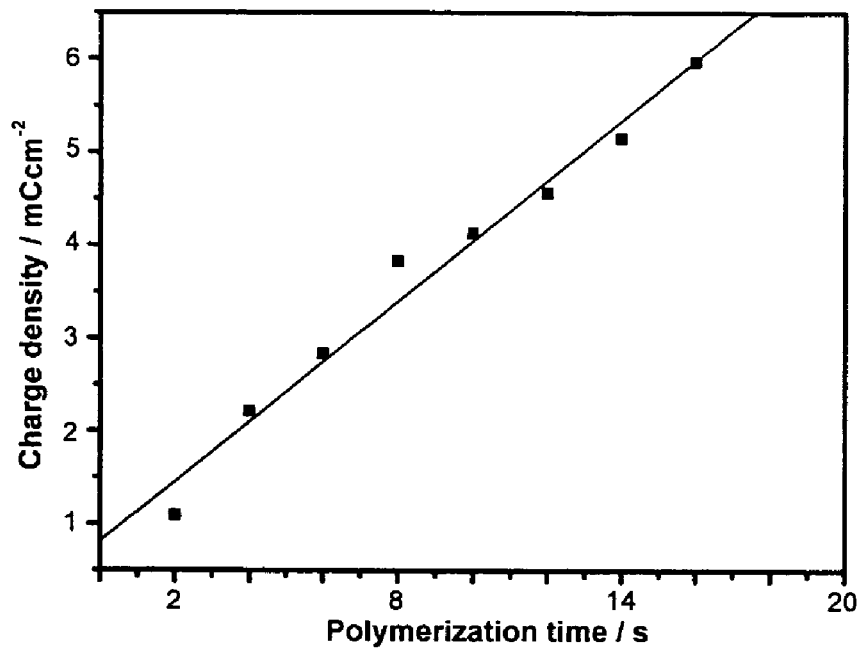
Fig. 3a
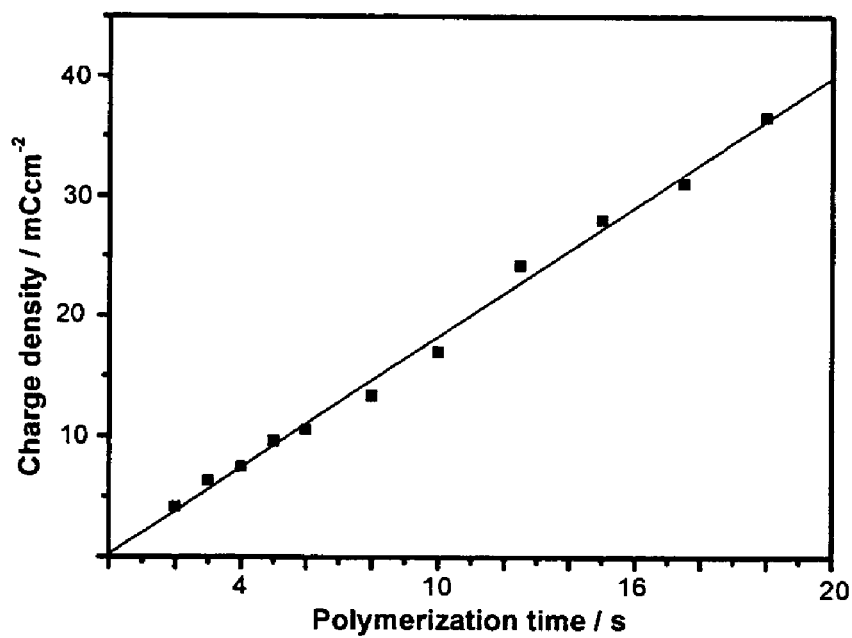
Fig. 3b

Fig. 5
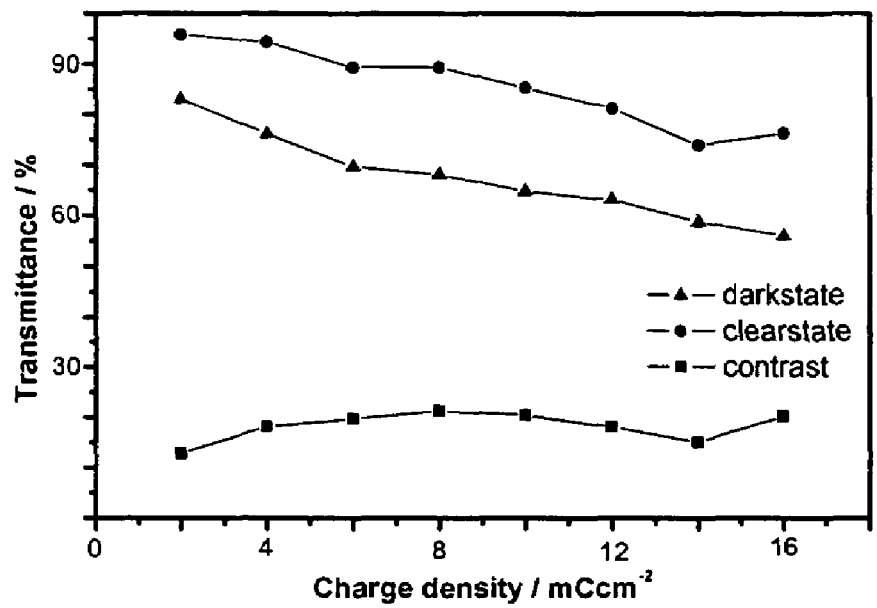
Fig. 5a
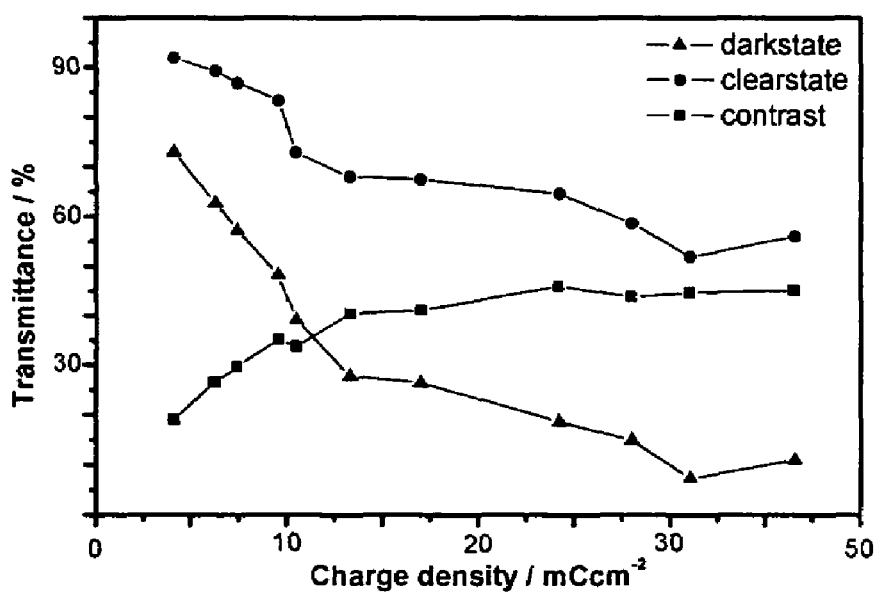
Fig. 5b

① 25°C (RT) -1, +1.4 volts (Blue color)
② -30°C, -5v, +5 volts (orange color)
③ -30°C, -3v, +3 volts (Green color)
④ -30°C, -1, +1.4 volts (pink color)

GEL POLYMERS CONTAINING IONIC LIQUIDS

CROSS REFERENCES AND RELATED APPLICATIONS

This application claims priority from U.S. Provisional Application No. 60/657,604 entitled "ELECTROCHROMIC DEVICES CONTAINING IONIC LIQUIDS" filed Mar. 1, 2005 and U.S. Provisional Application No. 60/664,651 entitled "ELECTROCHROMIC DEVICES CONTAINING IONIC LIQUIDS" filed Mar. 23, 2005 herein incorporated by reference in their entireties.

BACKGROUND

Electrochromism refers to the ability to change the optical properties of a material upon application of a potential. The tunability of the optical properties of conjugated polymers as a function of potential makes them very useful electrochromic materials. Some of the key advantages of conjugated polymers over inorganic electrochromic materials include wide range of color tunability, ease of processing, low operational voltages and extraordinary color retention.

Both organic and inorganic materials have been used to design and construct electrochromic devices which work as electrochemical cells; the most simple configuration for one of these devices consist of a four layer assembly, a transparent electronic conductive film (usually ITO) covered by the electroactive material (organic or inorganic), an ionic conductive medium, and another transparent electronic conductive film to complete the cell. The use of only one electroactive film leads to short-life devices. Shortened device life is believed to be caused by the lack of a second electroactive film working as counter electrode; a second electrode would be able to complete the redox process in the cell and reduce or eliminate degradative reactions in the electrolyte. This issue has been addressed by the use of dual-type configurations, in which a fifth ion-storage layer, which could also have electrochromic function, is included in the assembly to work as counter electrode. This configuration could be used to obtain two mixed colored states or, using two materials with complementary optical characteristics, enhance the contrast between the previously defined states.

Among all the efforts made to obtain all possible combinations of colors in electrochromic devices, the possibility of switching between a transparent and a colored state has attained a lot of attention for its direct application in systems in which a control over the intensity of the light radiation passing through the device is pursued. Materials with the above characteristics can be incorporated into intelligent windows capable of providing constant light intensity irrespective of external illumination. Based on this property conjugated polymers have been proposed and demonstrated as potential candidates for rearview mirrors that eliminate glares, smart optical attenuation systems which could be useful in architectural windows, goggles, and helmets.

The common feature of all these applications is that they are able to modify the conditions in which the visible light is perceived by human eye in a fixed situation. The human eye is a factor in the development of these devices because there are substantial differences in the way the eye perceives the visible spectrum under different conditions. Photopic and scotopic visions may be considered when making such systems.

There are two kinds of light receptors in human eye: cones and rods. The former is sensitive to even small radiations but cannot perceive the different colors and are used under low illuminations and the latter can yield perceptions of the different colors, but need more radiation to get activated and are predominantly used in well illuminated conditions. The scotopic vision refers to situations wherein the cones are used under poorly illuminated situations and photopic vision is related to the use of rods under well-lit conditions. In each situation the eye is more sensitive to some wavelengths and less to others, so each wavelength has a relative weight in the overall spectrum perceived by the eye. The relative values for each wavelength have been standardized by the Commission Internationale de l'Eclairage (CIE).

There is a continued need for electrochromic devices with high switching speeds, that can be used near a subjects eyes, and that have good contrast between colored or transmissive states. There is a continued need for gel-electrolytes for electrochromic systems that are able to transport the ions efficiently and are highly transparent.

SUMMARY

Embodiments of the present invention include electrochromic cells that may enact a color change and devices that use electrochromic cells wherein the electrochromic cells contain a UV curable crosslinking gel polymer with an ionic liquid.

The electrochromic cells of the invention may include a first transparent substrate onto which a first electrically conductive transparent electrode has been bonded onto the surface of the first substrate and a second transparent substrate onto which a second electrically conductive transparent electrode has been bonded onto the surface of the second substrate. First and second electrochromic layers are then bonded to the first and second electrically conductive transparent electrodes, respectively, and the electrochromic layers are simultaneously contacted by a UV curable solid state cross linking gel containing an ionic liquid that allows substantially no contact between the first and second electrochromic layers. Ionic liquids may be any organic salt with a melting point below about 100° C. and include imidazolium, pyridinium, phosphonium and tetralkylammonium based compounds, 1-Ethyl-3-methylimidazolium tosylate, 1-Butyl-3-methylimidazolium octyl sulfate, 1-Butyl-3-methylimidazolium 2-(2-methoxyethoxy)ethyl sulfate, 1-Ethyl-3-methylimidazolium bis(pentafluoroethylsulfonyl)imide, 1-Ethyl-3-methylimidazolium bis(trifluoromethylsulfonyl)imide, 1-Ethyl-3-methylimidazolium bromide, 1-Ethyl-3-methylimidazolium hexafluorophosphate, 1-Butyl-3-methylimidazolium bromide, 1-Butyl-3-methylimidazolium trifluoromethane sulfonate, 1,2-Dimethyl-3-propylimidazolium tris(trifluoromethylsulfonyl)methide, 1,2-Dimethyl-3-propylimidazolium bis(trifluoromethylsulfonyl)imide, 3-Methyl-1-propylpyridinium bis(trifluormethylsulfonyl)imide, 1-Butyl-3-methylpyridinium bis(trifluormethylsulfonyl)imide, 1-Butyl-4-methylpyridinium chloride, 1-Butyl-4-methylpyridinium hexafluorophosphate, 1-Butyl-4-methylpyridinium tetrafluoroborate, n-BMIMPF$_6$, BMIMBF$_4$, phosphonium docecylbenzenesulfonate, phosphonium methanesulfonate, and combinations thereof. In some embodiments of the present invention, the operating temperature of electrochromic cells containing ionic liquids is from about −30° C. to about 100° C.

In embodiments of the present invention, the UV curable solid state cross linking gel polymer includes one or more macromonomers, a photoinitiator and an ionic liquid as described above. Macromonomers may be vinyl macromonomers with poly(ethyleneglycol) side chains including poly(ethyleneglycol)ethylether methacrylate (MA), poly(ethyleneglycol) diacrylate (DA), derivatives of MA and DA and combinations and mixtures of these. Photoinitiators may be any agent that initiates a polymerization reaction when exposed to light. In certain embodiments, the photoinitiator initiates polymerization when exposed to UV light. Non-limiting examples of photoinitiators include benzophenone, 2,2-dimethoxy-2-phenylacetophenone (DMPAP), dimethoxyacetophenone, xanthone, thioxanthone, and combinations thereof.

Embodiments of the present invention include transparent substrates that may be glass, ceramic, plastic vinyl, polycarbonate, polyphosphonate, polyethylene tetraphthalate (PET) or combinations of these and may be rigid or flexible.

Electrically conductive transparent electrodes of certain embodiments of the present invention include at least one metal oxide, doped metal oxide, ITO, FTO, $SnO_2$, ZnO, AZO, $In_2O_3$, and combinations or mixtures thereof and may also include electrochromic conducting polymers such as PEDO-PSS and/or nanotubes.

Embodiments of the present invention include electrochromic layers that may change color or alter the transmittance of visible light through the device as a result of an electrical current passed through the electrochromic layer. In certain embodiments of the invention, the first electrochromic layer may be a cathodic electrochromic conducting polymer including but not limited to compounds such as PEDOT, PProDOT, PEDOP, PProDOP, PTT, PAEM-EDOT and combinations thereof. In some embodiments, the second electrochromic layer may be an anodic electrochromic conducting polymer such as but not limited to poly(BEDOT-NMCz). In other embodiments, the first and/or second electrochromic layers include compounds such as transition metal oxides, transition metal complexes, conducting polymers, viologens, polyaniline, polythiophene, $WO_3$, Prussian blue, and combinations thereof. Electrochromic layers may be deposited onto the substrate using a variety of methods including but not limited to electrochemical deposition, spin coating, electrospinning, layer by layer self assembly, chemical casting composition, dip coating or ink jet printing and are formed on electrodes with a current density of about greater than 1 $mC/cm^2$.

Electrochromic cells of certain embodiments of the present invention have a contrast of greater than 30%, switching speed from about 0.1 to 40 seconds and less than 75 seconds at temperature less than about −30° C., voltage range from about −10v to about 10v preferably about −1v to about 1.4v, and have a transmittance of from about 0.1% to about 80% visible light.

Embodiments of the invention also include methods by which electrochromic cells containing ionic liquids may be made. In certain embodiments, a gel polymer containing one or more macromonomers, an ionic liquid and a photoinitiator is photopolymerized between a first and second electrochromic layer. The electrochromic may be bound to first and second transparent electrically conductive electrodes which may be bound to first and second transparent substrates.

In further embodiments, electrochromic devices that contain electrochromic cells containing ionic liquids may be made by coating a first transparent substrate with a first electrically conductive transparent electrode and coating a second transparent substrate with a second electrically conductive transparent electrode. The first and second coated substrates are then coated with a first and second electrochromic layers, respectively. A UV curable solid state cross linking gel polymer mixture the includes one or more macromonomers, a photoinitiator and an ionic liquid is used to cover the first coated substrate, and the first and second coated substrates are put into contact with the gel polymer mixture. The layers are then sealed between the substrates so that the device is substantially air and water tight. In certain embodiments of the invention, inert spacers that may be beads of glass, vinyl, plastic, ceramic or the like and combinations of these are placed within the gel polymer allowing substantially no contact between the first and second electrochromic layers.

BRIEF DESCRIPTION OF FIGURES

The file of this patent contains at least one drawing/photograph executed in color. Copies of this patent with color drawing(s)/photograph(s) will be provided by the Office upon request and payment of the necessary fee.

FIG. 3. shows the relationship between charge density and polymerization time for a) PBENMCz and b) PEDOT.

FIG. 5. shows the relationship between charge density and contrast for PEDOT and PBENMCz.

DETAILED DESCRIPTION

Figure 1:
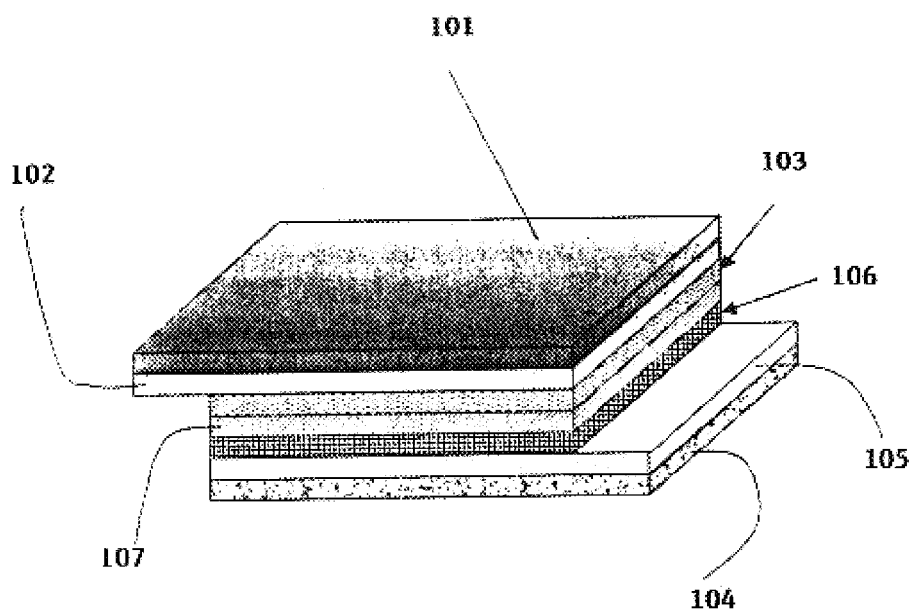
FIG. 1. is an illustration of a potion of an electrochromic display device.

Before the present compositions and methods are described, it is to be understood that this invention is not limited to the particular molecules, compositions, methodologies or protocols described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "cell" is a reference to one or more cells and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference. Nothing herein is to be construed as an admission that the invention is not entitled to antedate such disclosure by virtue of prior invention.

"Optional" or "optionally" means that the subsequently described event or circumstance may or may not occur, and that the description includes instances where the event occurs and instances where it does not.

"Transmittance" refers to the ratio of the radiant power transmitted through a material or device to the incident radiant power. Transmittance is usually expressed as a percent. For example, an electrochromic device with a 50% transmittance (at a specific wavelength) will absorb half of the light incident on it and allow half of it to pass through it.

"Contrast ratio" is the ratio of the transmittance in the colored state and the transmittance in the bleached state (at a specific wavelength) for an electrochromic device.

The "switching speed" of an electrochromic device is the time that an electrochromic device needs to change the optical density from the fully bleached state to the fully colored state.

The temperature range over which an electrochromic device can be operated properly is referred to as the "operating temperature".

Electrochromism refers to the reversible change in optical properties that occurs when a material is oxidized (loss of electrons and charge balance by transport of negative counter ions) or reduced (gain of electrons and charge balance by transport of positive counter ions). Polychromic materials may be used. Electrochromism includes devices that modulate radiation in the near infrared, thermal infrared, visible, and ultraviolet, and microwave regions. Electrochromic materials may be used with the photo-polymerized polymer electrolyte and may include but are not limited to transition metal oxides like $WO_3$, Prussian blue, viologens, conducting polymers like polyanaline and polythiophenes, transition metal complexes, and other materials.

The present invention encompasses electrochromic devices that are capable of undergoing an electrochromatic color change that include a gel polymer containing an ionic liquid FIG. 1 shows a general construction of a transmissive type electrochromic display device. The display device has oppositely arranged front and back substrates 101, both may be transparent glasses, plastics, ceramics or the like and combinations of these. A transparent conductive film like ITO is deposited on the inner surface of the front substrate 102, and, as a display working electrode, a first electrochromic layer is formed on the conductive film 103. This display electrode is formed of a first type electrochromic material which assumes a characteristic color in an electrochemically oxidized or reduced state 103. The inner surface of the back substrate 104 is coated with a conductive film 105, and, as a counter electrode, a second electrochromic layer is formed on the back or lower conductive film 106. The counter electrode formed of a second type electrochromic material assumes a characteristic color in an electrochemically reduced or oxidized state, opposite to the state of the first electrochromic material 106. The two substrates are held spaced from each other and may be separated by a sealing material that is applied peripherally of the substrates to surround the electrochromic layers and prevent intrusion of contaminants into the display and prevent material from leaving the cell. The first electrochromic layer and the second electrochromic layer are separated by a polymer gel that includes an ionic liquid 107.

The gel polymers described in the present invention contain ionic liquids. Ionic liquids are organic salts with melting points under about 100° C., or lower than for example less than room temperature. Examples of ionic liquids that may be used in the present invention include but are not limited to imidazolium, pyridinium, phosphonium or tetralkylammonium based compounds, for example, 1-Ethyl-3-methylimidazolium tosylate, 1-Butyl-3-methylimidazolium octyl sulfate; 1-Butyl-3-methylimidazolium 2-(2-methoxyethoxy) ethyl sulfate; 1-Ethyl-3-methylimidazolium bis (pentafluoroethylsulfonyl)imide; 1-Ethyl-3-methylimidazolium bis(trifluoromethylsulfonyl)imide; 1-Ethyl-3-methylimidazolium bromide; 1-Ethyl-3-methylimidazolium hexafluorophosphate; 1-Butyl-3-methylimidazolium bromide; 1-Butyl-3-methylimidazolium trifluoromethane sulfonate; 1,2-Dimethyl-3-propylimidazolium tris(trifluoromethylsulfonyl)methide; 1,2-Dimethyl-3-propylimidazolium bis(trifluoromethylsulfonyl)imide; 3-Methyl-1-propylpyridinium bis(trifluormethylsulfonyl)imide; 1-Butyl-3-methylpyridinium bis(trifluormethylsulfonyl) imide; 1-Butyl-4-methylpyridinium chloride; 1-Butyl-4-methylpyridinium hexafluorophosphate; 1-Butyl-4-methylpyridinium tetrafluoroborate; n-BMIMPF$_6$, BMIMBF$_4$, phosphonium docecylbenzenesulfonate, phosphonium methanesulfonate, and mixtures of these.

Ionic liquids allow effective ion transport even at low temperatures. Conventional electrochromic cells have limited operational temperature range since at low temperatures electrolytes do not support ionic conduction in the cell, and at very low temperatures electrolytes may freeze. The use of ionic liquids in gel polymer containing electrochromic cells alleviates this problem creating an electrochromic cell with an operational temperature range from about −30° C. and 95° C.

The operating voltage range of electrochromic cells containing a gel polymer with an ionic liquid may be better than that of conventional electrolyte containing electrochromic cells. For example, the operating range of the device described in the present invention may be from about −1 to 1.4 volts. Increasing the voltage range may improve the contrast and a switching speed of the devices that utilize ionic liquids.

Furthermore, the use of ionic liquids in electrochromic cells eliminates the need for plasticizers in the gel since ions in the ionic liquid may be capable of catalyzing polymerization.

The amount of ionic liquid in the gel polymer can range from about 10% to about 80% by weight, or from about 30% to about 60% by weight. In one embodiment the ionic liquid used in the gel polymer is n-BMIMPF$_6$. Ion transport evaluation of electrochromic devices may be performed using electrochemical quartz crystal microbalance (EQCM) techniques.

In some embodiments, the substrate may be transparent, rigid, flexible, curved, lightweight, impact resistant or a combination of these. Examples of suitable substrates include but are not limited to ceramic, glass and plastic, for example, polycarbonate and polyphosphonate. The substrate supports a transparent conductive inner layer and may serve as a barrier against permeation and diffusion of chemical contaminants into the electrochromic medium, for example oxygen, water or other contaminants. Plastics for example may be coated with layers that greatly reduce the permeation of contaminants into the cell. The substrate may be coated with an electro conductive material such as for example ITO of sufficient thickness to allow electrical conduction or may be coated with layers of non-conducting transparent dielectrics such as $TiO_2$ or $SiO_2$ and subsequently coated with a transparent conductive material like ITO. Alternatively, the substrate may be impregnated with small conductive transparent particles.

Electrically conductive transparent materials that may be used for the coating on the inside of the substrate can include but is not limited to metal oxides including $In_2O_3$, $SnO_2$, ITO, ZnO, or combination of these as well as conducting polymers and carbon nanotubes. These metal oxides may also be doped with traces of fluorides, antimony or aluminum to improve the conductivity.

Electrochromic conducting polymers on a first electrode that may be used with the photo-polymerized gel polymer including an ionic liquid of the present invention include but are not limited to optionally substituted polypyrroles, polyanalines, polythiophenes and others. In some embodiments, the electrochromic conducting polymer for the first electrode are optionally substituted polythiophenes including but not limited to PEDOT or PEDOT prepared by electropolymerization.

Electrochromic conducting polymers for the second electrode may be the same or different than the electrochromic conducting polymer of the first electrode and include but are not limited to optionally substituted polythiophene including [poly(bis-EDOT-N-methylcarbazole)] commonly referred to as PBEDOT-NMeCz or PBENMCz. In some embodiments, dual polymer devices use for example PEDOT, PTT, PAEM-EDOT with poly(BEDOT-NMCz) and PAEBEDOT-NmeCz. The electrochromic polymers disclosed herein may be prepared from monomers such as 3,4-ethylenedioxythiophene (EDOT) and bis(3,4-ethylenedioxythiophene)-N-methyl carbazole (BENMCz). Other electrochromic polymers that may be used include those disclosed in Avni, A. Argun. et. al. Multicolored Electrochromism in Polymers: Structures and Devices, Chem. Mater. Reviews (2004) 16(23), 4401-4412, and U.S. Pat. No. 6,791,738 B2 to Reynolds et al., the contents of which are hereby incorporated by reference in their entirety.

Figure 2:
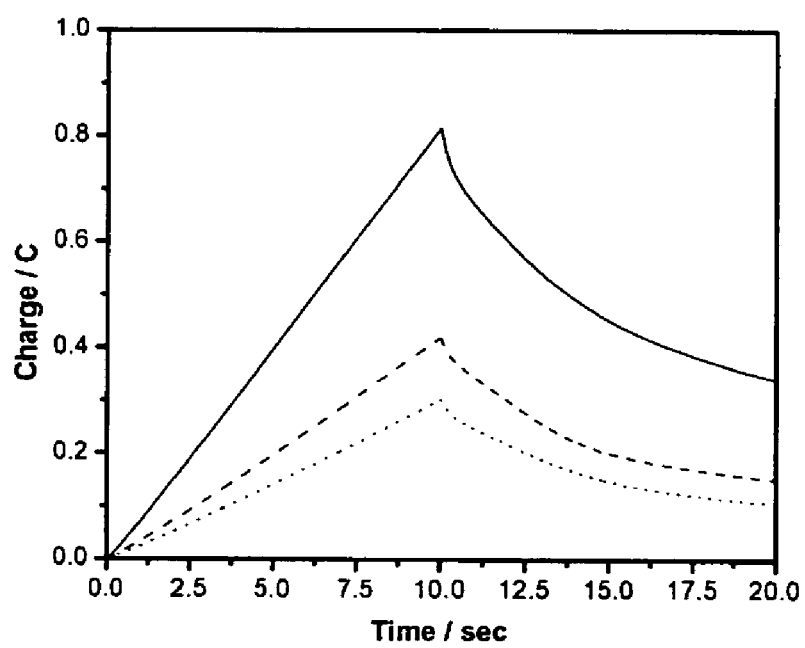
FIG. 2. shows chronocoulometric data obtained during polymerization of EDOT using metallic contact at one point (dotted line), one-side (dashed line), and whole perimeter (solid line) of the ITO glass.

A potentiostat and an electrode may be used to electropolymerize PEDOT onto a transparent conductive substrates from an acetonitrile solution containing from about 20 mM to about 1 mM EDOT at about 1 to about 1.4 V preferably at about 1.3 V (vs Ag/Ag+). PBENMCz may be grown onto transparent conductive substrates from a solution containing about 0.5 to about 5.0 mM, preferably about 1 mM BENMCz with about 0.05 to about 1 M preferably about 0.1 M lithium salt at about 0.6 to about 1.2 V, preferably about 0.7 V (vs Ag/Ag+). FIG. 2 shows chronocoulometric data obtained during polymerization of EDOT using metallic contact at one point (dotted line), one-side (dashed line), and whole perimeter (solid line) of the ITO glass.

The gel polymers of the present invention may include a vinyl macromonomer with poly(ethylene glycol) side chains and may be prepared using the macromonomer, and a photoinitiator to compensate for the charge injected into or extracted from the conducting polymer. Examples of vinyl macromonomers that may be used to form the gel electrolyte may include, but are not limited to, poly(ethyleneglycol)ethylether methacrylate (MA), poly(ethyleneglycol) diacrylate (DA).

The gel may be prepared using a photoinitiator. Polymerization of the monolithic gel may be achieved using hydrogen abstracting photoinitiators including, but not limited to, benzophenone, 2,2-dimethoxy-2-phenylacetophenone (DMPAP), dimethoxyacetophenone, xanthone, and thioxanthone. In one embodiment the initiator may include 2,2-dimethoxy-2-phenyl-acetophenone (DMPAP).

Polymerization may also be thermally induced at about 40° C. to about 70° C., preferably about 50° C. using peroxide initiators such as benzyl peroxide (BPO) or azo bis isobutylnitrile (AIBN).

In assembling an electrochromic cell or device, the gel ionic liquid solution may be poured onto the first electrochromic conducting polymer coated on a transparent conductive substrate at a thickness of about 5 to about 30 μm. The second electrochromic conducting polymer coated on another transparent conductive substrate may be then placed over the first electrochromic conducting polymer with the conducting surfaces facing each other. Inert spacers, such as for example, glass beads may be dispersed in the gel polymer including an ionic liquid to keep the two electrodes from contacting one another in the solid-state device. The two electrodes may be pressed together to remove any trapped air bubbles and squeeze out excess gel polymer including an ionic liquid solution.

Polymerization of the macromonomer in the gel polymer including an ionic liquid may be carried out in at a suitable wavelength of light and temperature for a period of time that results in the polymerization or gel formation. For example, UV light from a lamp source can be used.

The device including two conductive substrates each having an electrochromic material electrode with a gel polymer including an ionic liquid between them may be sealed together using polymer such as but not limited to a UV cross-linkable polymeric gels. The device may be further treated by encapsulating it in a resin to reduce or eliminate the intrusion of contaminants like moisture and or oxygen into the cell. The quality of encapsulation may be tested by immersing the devices into a slightly acidified aqueous solution containing, for example, an Iron (III) thiocyanate complex. Poorly sealed devices are totally delaminated and the gel polymer including an ionic liquid cracks completely with uptake of the intensely colored dye. No change in the switching response (contrast and switching speed) was observed for well sealed devices even after subjecting the devices to vacuum at 75° C.

For electropolymerization over a large area, steps may be taken (i.e. the choice of electrode materials) to reduce a drop in potential along the surface and provide a more uniform deposition of electrochromic polymer films, thickness, with increasing distance from the applied potential contact point. For example, one way to provide a more uniform deposition is to cover the perimeter of the outer substrate plate with an adhesive copper tape. This leads to a lower gradient of the electric field all along the surface, leading to more uniform films. The charge density on the electrode may also be used to modify the polymerization and deposition uniformity. An increase in the charge density (i.e., rate of polymer deposition) leads to thicker films. Charge density can range from about 1 $mC/cm^2$ to about 50 $mC/cm^2$. In one embodiment, the electrochemical cell for electropolymerization allows use of an adhesive copper contact which is advantageous since traditional electrochemical cell all but one side of the plate is immersed in the solution, avoiding this improvement. In one embodiment for making uniform electrochromic layers, the electrode materials, cell configuration and current density are adjusted to where the relationship between the density charge and time of polymerization are approximately linear as shown in FIGS. 3a and 3b, and visually confirmed that the thickness gradient all along the surface was minimized.

Figure 4:
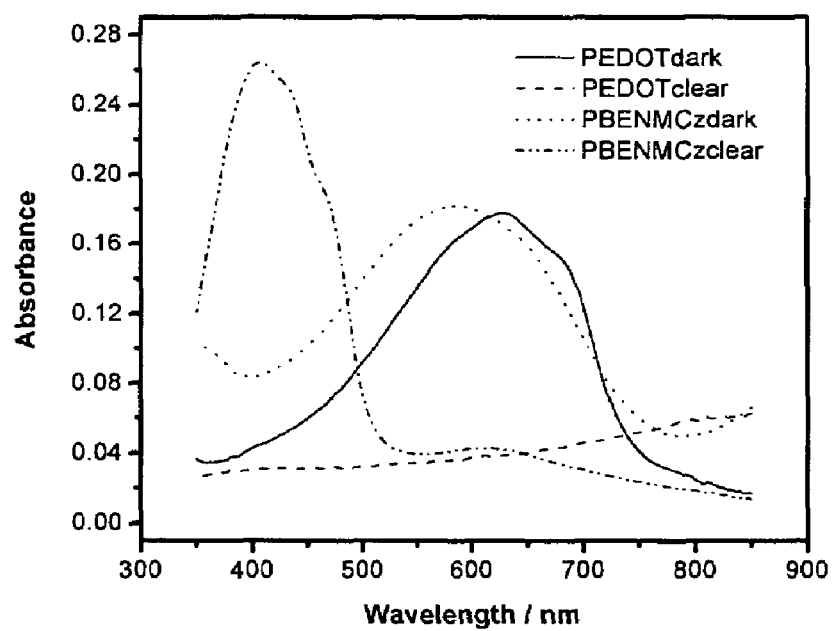
FIG. 4. shows absorbance spectra of PEDOT and PBENMCz in the visible region.

The optical characteristics of the working and counter electrode materials chosen for the electrochromic device may have complementary colors or approximately complementary colors in the charged or neutral states. For example, the optical characteristics of PEDOT and PBENMCz are complementary. PEDOT is a cathodically electrochromic coloring conducting polymer that has been used in several electrochromic devices and goes from a transparent sky blue in its oxidized state to a deep indigo blue in the neutral state with a maximum absorbance centered at ~620 nm. PBENMCz goes from a pale yellow in the neutral form to a deep blue in its oxidized form (λmax in oxidized form=570 nm). The anodically coloring PBENMCZ has been shown to be a suitable complementary polymer of PEDOT. Spectrums of both polymers were taken in their reduced and oxidized forms, and they are shown in FIG. 4.

Although the maximum change could be centered at one wavelength whenever the transmissive state of an electrochromic device is switched, the effect is distributed over the whole visible spectrum. One method for evaluating electrochromic devices is to show the data for photopic contrast calculated over the whole visible range instead of only calculating it in one particular wavelength. This method is successful as long as the devices are going to be used mostly under daylight conditions.

To obtain the contrast characteristics of electrochromic polymers used for the working and counter electrodes in a device, a series of electrochromic polymers prepared at various charges densities may be prepared. The transmittance spectrum of the polymers prepared with the different charge densities in the charged and neutral state can be measured. For example, the contrast characteristics of PEDOT and PBENMCz may be obtained from polymer films prepared with increasing charge densities. The transmittance spectrum of PEDOT in the neutral and oxidized forms may be recorded at constant potentials of −1.2 V and −0.15 V (vs Ag/Ag+) respectively. The neutral and oxidized form transmittance spectra of PBENMCz may be obtained at constant potentials of −0.7 V and 0.2 V (vs Ag/Ag+) respectively. The absorption of the substrate and transparent conductive electrode and the ionic liquid are preferably subtracted. The photopic transmittance in the clear and dark states and the photopically weighted contrast (i.e., the difference between the values in the clear and dark states) may be calculated. The relationships between contrast and charge density as related to the thickness of the film for each polymer can be plotted as illustrated in FIG. 5.

One embodiment of an electrochromic display that includes electrochromic polymer electrodes and a gel electrolyte has a stable, variable transmission, at least 85% photopic at twilight and at least 30% photopic at daylight with fast-switching elements of about 0.1 to about 0.25 sec at temperatures lower than about 20° C. In another embodiment the electrochromic display is a helmet mounted display (HMD's). In some embodiments, the electrochromic multilayer, dual polymer devices with gel polymer electrolyte may use PEDOT, PTT, PAEM-EDOT with poly(BEDOT-NMCz) and PAEBEDOT-NMeCz on both flat and curved substrates.

The performance of fabricated devices electrochromic devices may be evaluated in terms of switching time and transmission contrast at environmental chambers under different humidity (30% to 90% relative humidity) and temperature (between −30° C. and 95° C.) conditions. These devices may be tested at reduced pressures. A cycling voltage to operate the cell may be determined by cycling cells at different voltages and monitoring changes in the % T in the clear state after a number of cycles. Potential cycling or stepping can be used to identify the preferred device voltage for a desired operating life. Other cell parameters that can be evaluated by potential cycling may include the rise time, switching time from dark to clear state, and fall time, switching time from clear to dark states of the solid-state devices.

Figure 6:
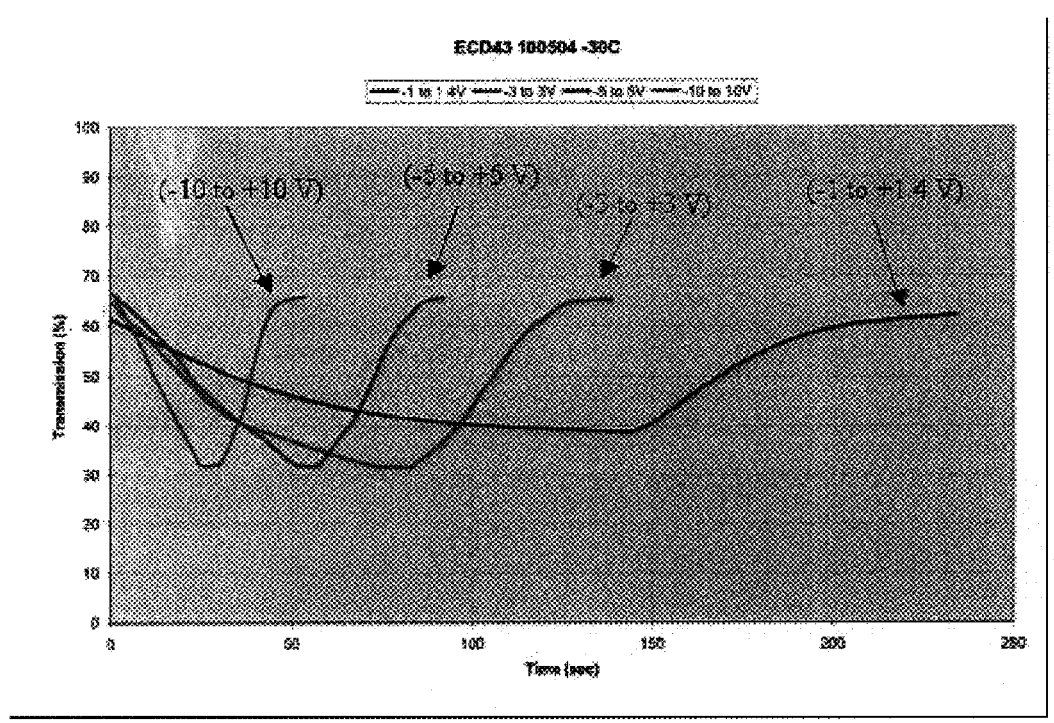
FIG. 6. shows the electrochromic response of an electrolyte containing electrochromic cell at room temperature and −30° C. at different biased voltages.
Figure 7:
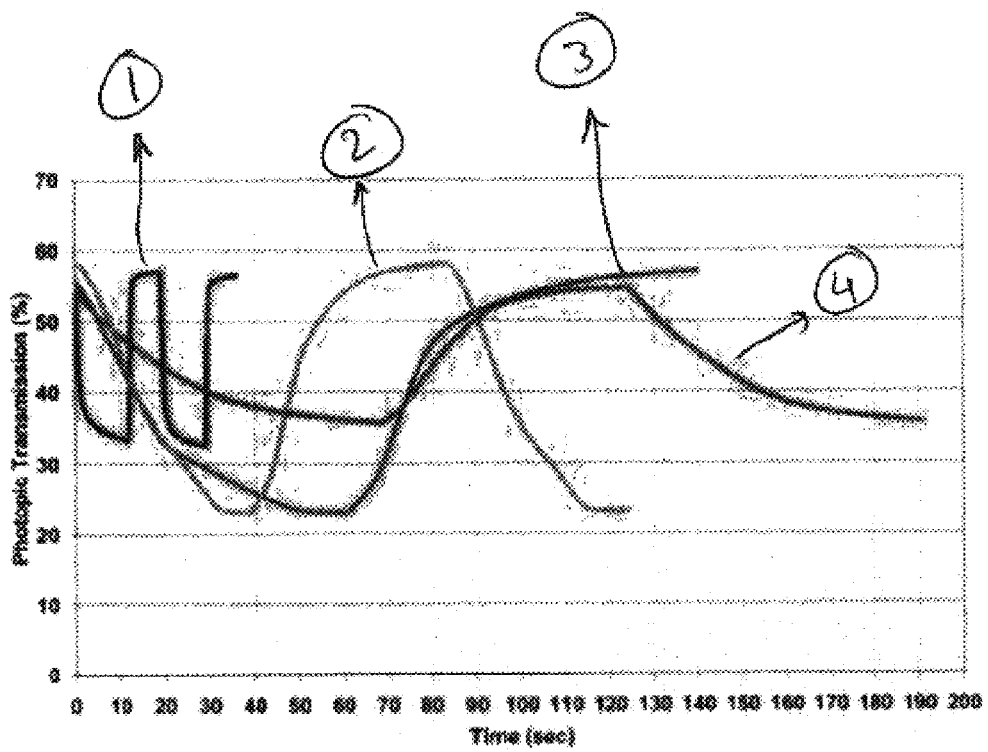
FIG. 7. shows the electrochromic response of ionic liquid containing electrochromic cell at room temperature and −30° C. at different biased voltages.
Figure 8:
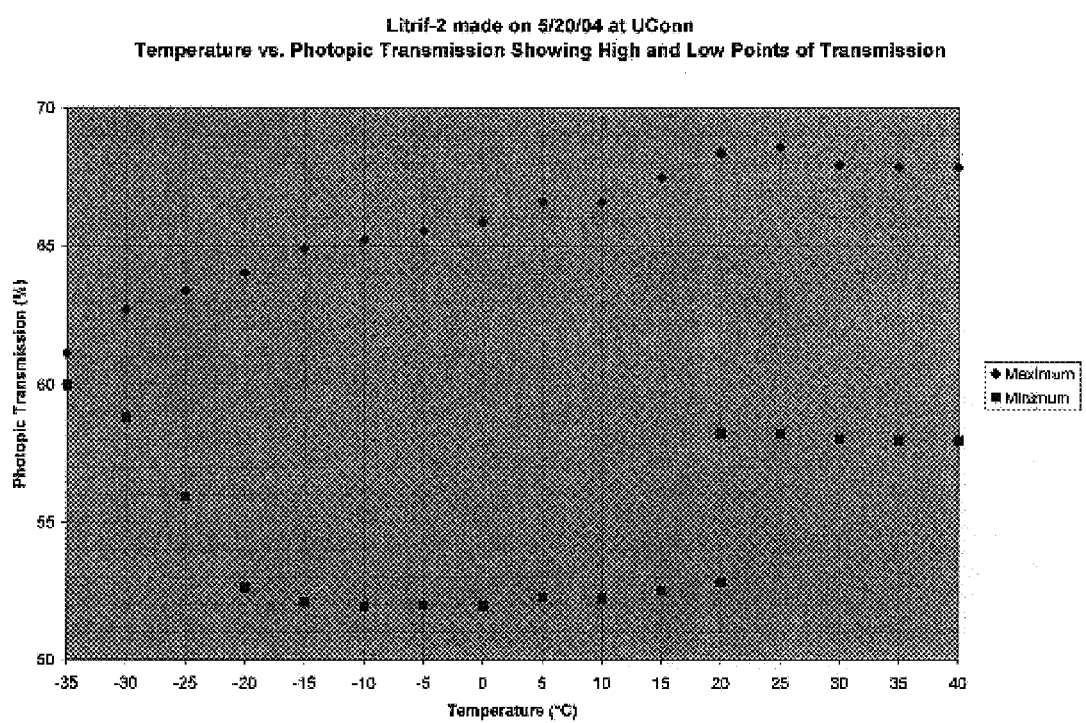
FIG. 8. shows temperature versus photopic transmission for an electrolyte containing electrochromic cell showing high and low points of transmission.
Figure 9:
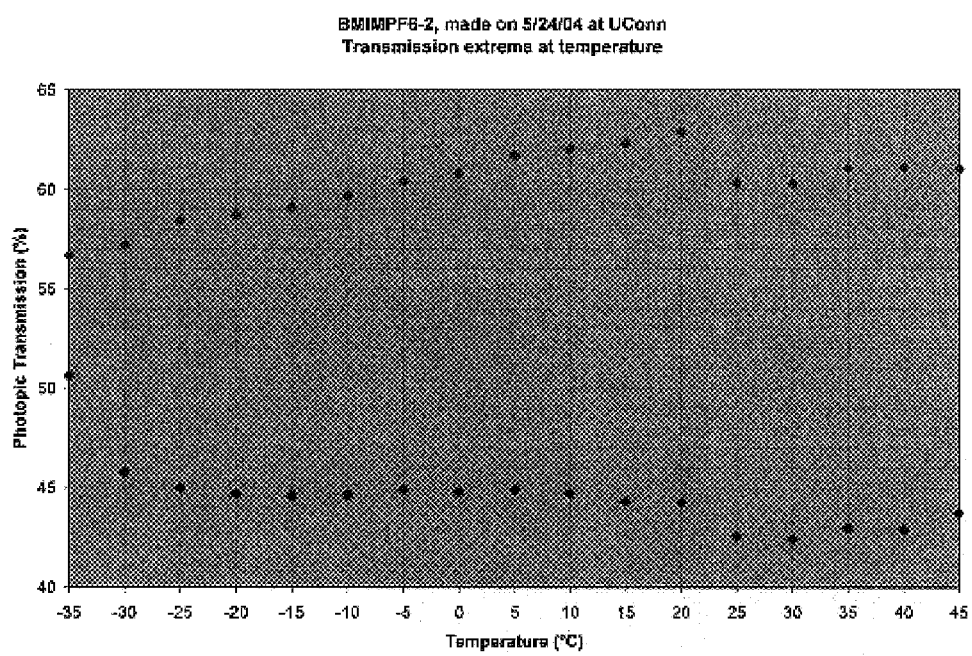
FIG. 9. shows the transmission at extreme temperatures of ionic liquid containing electrochromic cell.
Figure 10:
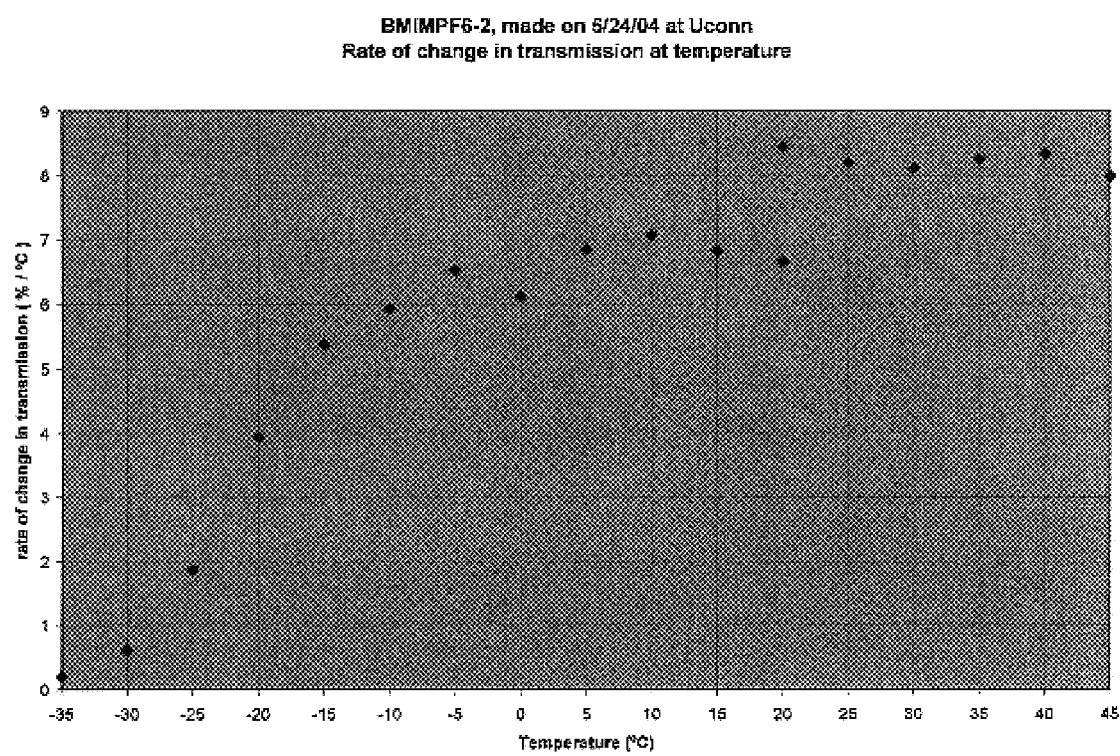
FIG. 10. shows the switching speed versus temperature of ionic liquid containing electrochromic cell.
Figure 11:
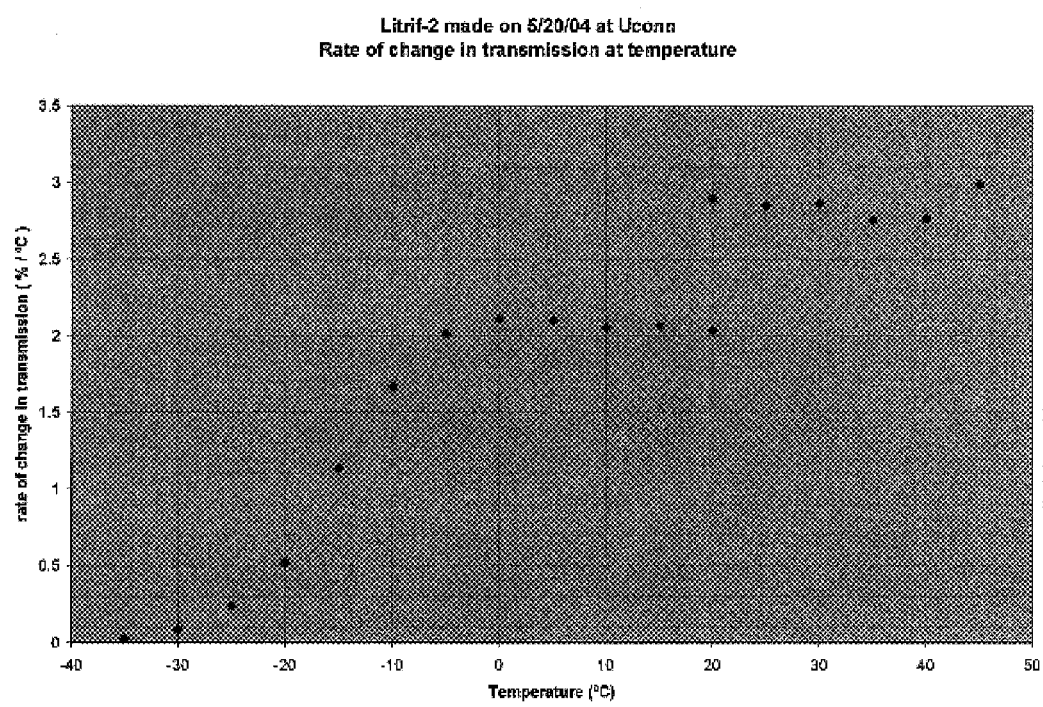
FIG. 11. shows the switching speed versus temperature of electrolyte containing electrochromic cell.

FIG. 7 shows the electrochromic response of an ionic liquid containing electrochromic cell at room temperature and −30° C. at different biased voltages, and for comparison, FIG. 6. shows the electrochromic response of an electrolyte containing electrochromic cell at room temperature and −30° C. at different biased voltages. These data clearly show improved switching time of ionic liquid containing electrochromatic cells of the present invention at both room temperature (25° C.) and low temperature (−30° C.).

In one embodiment of the present invention, the first electrochromic layer may be formed in a desired pattern such as a letter or image. The second electrochromic layer that serves as the counter electrode is formed over almost the entire effective surface area of the underlying conductive film. The first electrochromic layer patterns may be individually addressable and can be used to form pixels in a display.

Advantages of the compositions and devices made using them include improved safety for users of electrochromic devices, especially electrochromic display devices used in helmets and other devices like glasses located close to the eyes of an individual. Examples of devices include but are not limited to mirrors, optical shutters, windows, goggles, glasses, welding visors or other devices that can change optical or more generally electromagnetic transmission as a result of an applied potential.

In one embodiment, large area electrochromic window are prepared that include two different conjugated polymers as working and counter electrode and a photo-polymerized gel polymer including an ionic liquid between them. Conjugated polymers that can be used include those whose interaction with electromagnetic radiation can be reversibly changed by application of an external voltage to the polymer to cathodically or anodically charge the polymer. These electrochromic polymers may be electrochemically grown or formed on large conductive transparent electrodes or other substrates coated with a transparent electrically conductive film. For example, visible light transparent conductive metal oxides like ITO coated glass and ITO coated poly(ethylene terephthalate) films can be coated with electropolymerized electrochromic polymers to form electrodes for the device. Although electropolymerization is preferred for making the polymer electrodes, chemical polymerization may also be used.

The examples below are merely representative of the work that contributes to the teaching of the present invention, and the present invention is not to be restricted by the examples that follow.

EXAMPLE 1

This hypothetical example illustrates an electrochromic display device as illustrated in FIG. 1 having electrochromic working and counter electrodes, and a polymer gel including an ionic liquid.

Materials: 3, 4-Ethylenedioxythiophene (EDOT) and 3,6-dibromocarbazole were purchased from Aldrich, and EDOT can be distilled under reduced pressure before use. bis(3,4-ethylenedioxythiophene)-N-methyl carbazole (BENMCz) can be synthesized using methods known in the art. Dibromo-N-methyl carbazole can be obtained in near quantitative yields by running the reaction for longer times (12 hours) at room temperature. Acetonitrile can be procured from Fisher scientific and freshly distilled over calcium hydride (from ACROS). The PEDOT electrochromic electrode can be grown electrochemically onto 3"×3" in ITO glass at 1.3 V (vs Ag/Ag+) from an acetonitrile solution containing 20 mM EDOT, while the PBENMCz electrochromic electrode can be grown onto 3"×3" ITO coated PET from a 1 mM BENMCz solution with 0.1 M LITRIF at 0.7 V (vs Ag/Ag+). ITO glass and PET-ITO were used as substrates for the cell.

Both CHI 400 and CHI 660 A potentiostats were used for the electropolymerization of EDOT and BENMCz. These potentiostats were also used for the switching studies and other electrochemical characterizations of the solid state device. A UV lambda 900 spectrophotometer can be used for the optical studies on the devices.

Electropolymerization of conjugated polymers could be performed in a cell designed for the electropolymerization on 3×3 inches plates but could be used for substrates of a variety of sizes.

PEDOT can be grown in the oxidized transmissive sky-blue color form, can be washed with acetonitrile and dried. PBENMCz can be reduced to the pale yellow neutral form at −1 V washed with acetonitrile and dried before constructing the device.

The gel electrolyte can be composed of a vinyl macromonomers with poly(ethylene glycol) side chains (poly(ethyleneglycol)ethylether methacrylate (MA) and poly(ethyleneglycol) diacrylate (DA)), photoinitiator (2,2-dimethoxy-2-phenyl-acetophenone (DMPAP)), plasticizer (propylene carbonate) and an ionic liquid for example room temperature 1-butyl-3-methylimidazolium hexafluorophosphate ($BMIMPF_6$) to compensate for the charge injected into or extracted from the conducting polymer. Several preparations of the gel electrolyte composition are shown in Table 1.

TABLE 1

Different composition of gels

| MA | DA | Propylene carbonate (plasticizer) | DMPAP (Photoinitiator) |
|---|---|---|---|
| 10 g | 0 g | 0 g | 25.0 mg |
| 9.0 g | 0 g | 1.0 g | 22.5 mg |
| 8.0 g | 0 g | 2.0 g | 20.0 mg |
| 7.0 g | 0 g | 3.0 g | 17.5 mg |
| 6.0 g | 0 g | 4.0 g | 15.0 mg |
| 5.0 g | 0 g | 5.0 g | 12.5 mg |
| 0 g | 10 g | 0 g | 25.0 mg |
| 0 g | 9.0 g | 1.0 g | 22.5 mg |
| 0 g | 8.0 g | 2.0 g | 20.0 mg |
| 0 g | 7.0 g | 3.0 g | 17.5 mg |
| 0 g | 6.0 g | 4.0 g | 15.0 mg |
| 0 g | 5.0 g | 5.0 g | 12.5 mg |

* 1.0 g $BMIMPF_6$ 5 mg glass beads (50–100 microns) can be used in all compositions.

About 0.5 ml of the gel ionic liquid solution can be poured onto the PEDOT coated ITO glass and the PBENMCz coated PET-ITO glass can be placed over it with the conducting surfaces facing each other. Glass beads were dispersed in the gel electrolyte to keep the two electrodes out of contact. The two electrodes were pressed together to remove any trapped air-bubbles and squeeze out excess gel electrolyte solution. Polymerization of the macromonomer in the gel electrolyte can be carried out in UV light (365 nm) for 15 min (1500 $mJ/cm^2$).

The device can be then sealed using a polyurethane based UV curable resin to avoid loss of any plasticizer used or moisture affecting the gel electrolyte. The quality of sealing can be tested by immersing the devices into a slightly acidified aqueous solution containing an Iron (III) thiocyanate complex.

EXAMPLE 2

This comparative example illustrates the use and benefits of an ionic liquid rather than an electrolyte in the gel polymer.

Ionic Liquid Based Devices.

Oxidized PEDOT in the clear state was electrochemically grown on ITO-Glass at 1.3 V (vs $Ag/Ag^+$, 0.46 V vs NHE) to a charge density of 12.9 $mC/cm^2$. PBEDOT-NMCz was grown on ITO-PET at 0.7 V (vs $Ag/Ag^+$) to a charge density of 2.73 $mC/cm^2$ and further reduced at −1 V to obtained the clear state. The electrolyte comprised of 6 g of n-$BMIMPF_6$, 4 g PEGDA, 10.0 mg 2,2-dimethoxy-2-acetophenone (photoinitiator) and 5 mg glass beads (50-100 micron) was sandwiched between the two electrodes and cured for 20 min using a UV lamp (365 nm, 5.8 $mW/cm^2$) with the PET-ITO containing PBEDOT-NMCz on top. The device was sealed with UVS-91, UV curable polymers for 3 min using UV-lamp at the above mentioned conditions.

LiTRIF Electrolyte Gel Based Devices.

Control Oxidized PEDOT in the clear state was electrochemically grown on ITO-Glass at 1.3 V (vs $Ag/Ag^+$, 0.46 V vs NHE) to a charge density of 11.6 $mC/cm^2$. PBEDOT-NMCz was grown on ITO-PET at 0.7 V (vs $Ag/Ag^+$) to a charge density of 2.77 $mC/cm^2$ and further reduced at −1 V to obtained the clear state. The electrolyte comprised of 3 g of propylene carbonate, 7 g PEGMA, 1 g lithium trifluoromethane sulfonate, 20.0 mg 2,2-dimethoxy-2-acetophenone (photoinitiator) and 5 mg glass beads (50-100 micron) was sandwiched between the two electrodes and cured for 20 min using a UV lamp (365 nm, 5.8 $mW/cm^2$) with the PET-ITO containing PBEDOT-NMCz on top. The device was sealed with UVS-91, UV curable polymers for 3 min using a UV-lamp at the above mentioned conditions.

Comparison

Both the Ionic liquid based and LiTRIF based devices were characterized with respect to photopic contrast between bleached and oxidized states as a function of temperature. The data shown below in Table 2 and Table 3, show that the devices with the ionic liquid have a wider photopic contrast across a temperature range from −25° C. to 25° C. This provides a benefit in devices where wide photopic contrast is desired.

TABLE 2

Switching speed for the ionic liquid containing gel polymer devices

| Weight % of ionic liquid | Switching speed(sec) (C → B) | Switching speed(sec) (B → C) |
|---|---|---|
| 20% $BF_4$ - 80% PEG-DA | 0.5 | 0.9 |
| 40% $BF_4$ - 60% PEG-DA | 0.5 | 0.6 |
| 60% $BF_4$ - 40% PEG-DA | 0.4 | 0.5 |
| 80% $BF_4$ - 20% PEG-DA | 0.5 | 0.6 |
| 20% $PF_6$ - 80% PEG-DA | 0.9 | 1.4 |
| 40% $PF_6$ - 60% PEG-DA | 0.6 | 0.7 |
| 60% $PF_6$ - 40% PEG-DA | 0.6 | 0.8 |
| 80% $PF_6$ - 20% PEG-DA | 1.1 | 0.7 |

Additional characterization of the electrolyte composition was performed. Glass transition temperatures (Tg's) were identified for various ionic based electrolyte formulations where the percent of ionic liquid ranged from 20% to 80%. Tg of LiTRIF was also characterized for comparison. The results indicate the ionic liquid based gels all have lower Tg's than the LiTRIF gel which is beneficial for performance, especially at low temperatures.

TABLE 3

Glass transition temperature comparison of ionic liquids and electrolytes

| WEIGHT % OF ELECTROLYTES | $T_g$ (° C.) | WEIGHT % OF ELECTROLYTES | $T_g$ (° C.) |
|---|---|---|---|
| 20% BMIMPF$_6$ - 80% PEG-MA | −53.63 | 10% PC - 90% PEG-DA | −33.44 |
| 40% BMIMPF$_6$ - 60% PEG-MA | −56.93 | 20% PC - 80% PEG-DA | −36.38 |
| 60% BMIMPF$_6$ - 40% PEG-MA | −59.12 | 30% PC - 70% PEG-DA | −31.64 |
| 80% BMIMPF$_6$ - 20% PEG-MA | −72.01 | 40% PC - 60% PEG-DA | −44.48 |
| PEG-MA W/Litrif. | −37.43 | PEG-DA W/Litrif. | — |

Switching speed rates as a function of temperature for ionic liquid and LiTRIF based devices was also characterized. FIGS. 8, 9, 10 and 11 show that the rate of switching speed is faster across a wide temperature range in electrochromic cells using ionic liquids than in LiTRIF devices.

Although the present invention has been described in considerable detail with reference to certain preferred embodiments thereof, other versions are possible. Therefore the spirit and scope of the appended claims should not be limited to the description and the preferred versions contain within this specification.

What is claimed is:

1. An electrochromic cell comprising:
a first transparent substrate comprising a first electrically conductive transparent electrode bonded to the first substrate and an electrochemically formed first electrochromic layer bonded to the surface of the electrode;
a second transparent substrate comprising a second electrically conductive transparent electrode bonded to the second substrate and an electrochemically formed second electrochromic layer bonded to the surface of the electrode; and
a transparent UV curable solid state cross linking gel polymer containing an ionic liquid comprising an organic salt with a melting point under about 100° C. in contact with both the first and second electrochromic layer, wherein there is substantially no contact between the first and second electrochromic layers;
wherein the operating temperature of the electrochromic cell is from about −30° C. to about 95° C.,
and wherein the electrochromic cell is substantially free of oxygen and moisture.

2. The electrochromic cell of claim 1, wherein UV curable solid state cross linking gel polymer comprises one or more, macromonomers a photoinitiator and an ionic liquid.

3. The electrochromic cell of claim 1, wherein the ionic liquid is selected from imidazolium, pyridinium, phosphonium and tetralkylammonium based compounds, 1-Ethyl-3-methylimidazolium tosylate, 1-Butyl-3-methylimidazolium octyl sulfate, 1-Butyl-3-methylimidazolium 2-(2-methoxyethoxy)ethylsulfate, 1-Ethyl-3-methylimidazolium bis(pentafluoroethylsulfonyl)imide, 1-Ethyl-3-methylimidazolium bis(trifluoromethylsulfonyl)imide, 1-Ethyl-3-methylimidazolium bromide, 1-Ethyl-3-methylimidazolium hexafluorophosphate, 1-Butyl-3-methylimidazolium bromide, 1-Butyl-3-methylimidazolium trifluoromethane sulfonate, 1,2-Dimethyl-3-propylimidazolium tris(trifluoromethylsulfonyl)methide, 1,2-Dimethyl-3-propylimidazolium bis(trifluoromethylsulfonyl)imide, 3-Methyl-1-propylpyridinium bis(trifluormethylsulfonyl)imide, 1-Butyl-3-methylpyridinium bis(trifluormethylsulfonyl)imide, 1-Butyl-4-methylpyridinium chloride, 1-Butyl-4-methylpyridinium hexafluorophosphate, 1-Butyl-4-methylpyridinium tetrafluoroborate, n-BMIMPF$_6$, BMIMBF$_4$, phosphonium docecylbenzenesulfonate, phosphonium methanesulfonate, and combinations thereof.

4. The electrochromic cell of claim 1, wherein the macromonomer comprises a vinyl macromonomer with poly(ethyleneglycol) side chains.

5. The electrochromic cell of claim 4, wherein the macromonomers are selected from poly(ethyleneglycol)ethylether methacrylate (MA), poly(ethyleneglycol) diacrylate (DA), derivatives of MA and DA, and combinations thereof.

6. The electrochromic cell of claim 1, wherein the photoinitiator is selected from benzophenone, 2,2-dimethoxy-2-phenylacetophenone (DMPAP), dimethoxyacetophenone, xanthone, thioxanthone, and combinations thereof.

7. The electrochromic cell of claim 1, wherein polymerization of the gel polymer is initiated by UV light.

8. The electrochromic cell of claim 1, wherein the first transparent substrate and second transparent substrate are selected from glass, plastic, ceramic, vinyl, polycarbonate, polyphosphonate, polyethylene tetraphthalate (PET) or combinations thereof.

9. The electrochromic cell of claim 1, wherein said first electrically conducting transparent electrode and second electrically conducting transparent electrode are selected from at least one metal oxide, doped metal oxide, ITO, FTO, SnO$_2$, ZnO, AZO, In$_2$O$_3$, and combinations thereof.

10. The electrochromic cell of claim 1, wherein at least one of the first electrically conductive transparent electrode and the second electrically conductive transparent electrode further comprises at least one conducting polymers.

11. The electrochromic cell of claim 10, wherein the conducting polymer is PEDOT/PSS.

12. The electrochromic cell of claim 1, wherein the first electrochromic layer and second electrochromic layer are deposited on the substrate by methods selected from electrochemical deposition, spin coating, electrospinning, layer by layer self assembly, chemical casting composition, dip coating or ink jet printing.

13. The electrochromic cell of claim 1, wherein the first electrochromic layer comprises a cathodic electrochromic conducting polymer.

14. The electrochromic cell of claim 13, wherein the cathodic electrochromic conducting polymer comprises a compound selected from PEDOT, PProDOT, PEDOP, PProDOP, PTT, PAEM-EDOT and combinations thereof.

15. The electrochromic cell of claim 1, wherein the second electrochromic layer comprises an anodic electrochromic conducting polymer.

16. The electrochromic cell of claim 15, wherein the anodic electrochromic conducting layer comprises poly (BEDOT-NMC$_Z$).

17. The electrochromic cell of claim 1, wherein at least one of the first electrochromic layer and second electrochromic layer further comprises at least one compound selected from transition metal oxides, transition metal complexes, conducting polymers, viologens, polyaniline, polythiophene, $WO_3$, Prussian blue, and combinations thereof.

18. The electrochromic cell of claim 1, wherein at least one of the first electrochromic layer and second electrochromic layer is formed on an electrode with a current density of about greater than 1 in $C/cm^2$.

19. The electrochromic cell of claim 1, having a contrast that is about greater than 30%.

20. The electrochromic cell of claim 1, having a switching speed of about 0.1 to 40 seconds.

21. The electrochromic cell of claim 1, having a switching speed of about less than 75 seconds at a temperature of about less than −30° C.

22. The electrochromic cell of claim 1, having an operating voltage range of about −10v to about 10v.

23. The electrochromic cell of claim 1, having an operating voltage range of about −1v to about 1.4v.

24. The electrochromic cell of claim 1, having a transmittance of from about 0.1 to about 80% in visible light.

25. The gel polymer of claim 1, having a Tg that is at least about less than −50° C.

26. The electrochromic cell of claim 1, wherein the electrochromic cell is used in an optical and electro-optical device and optical attenuation devices selected from architectural, vehicle and aircraft windows, visors and goggles.

27. A method for making an electrochromic device comprising:
    photopolymerizing a gel polymer comprising at least one macromonomer, an ionic liquid, and a photoinitiator between a first electrochromic layer disposed on a first substrate and a second electrochromic layer disposed on a second substrate; and
    sealing the layers between the first substrate and the second substrate, wherein the electrochromic device is substantially free of oxygen and moisture.

28. The method of claim 26, wherein the first electrochromic electrode is bonded to a first transparent electrically conducting electrode and the second electrochromic layer is bonded to a second transparent electrically conducting electrode.

29. The method of claim 27, wherein the first electrochromic layer bonded to a first transparent electrically conducting transparent electrode is bonded to a first transparent substrate; and the second electrochromic layer bonded to a second transparent electrically conducting transparent electrode is bonded to a second transparent substrate.

30. A method for making an electrochromic device comprising:
    coating a first substrate with a first electrically conductive transparent electrode;
    coating a second substrate with a second electrically conductive transparent electrode;
    coating the first coated substrate with a first electrochromic layer;
    coating the second coated substrate with a second electrochromic layer wherein the first electrochromic layer and the second electrochromic layer are different;
    covering the first coated substrate with the first electrochromic layer with a transparent, UV curable solid state cross linking gel polymer mixture comprising one or more macromonomers, a photoinitiator and an ionic liquid;
    contacting the first coated substrate with the first electrochromic layer with the second coated substrate with the second electrochromic layer wherein the second electrochromic layer is in contact with the gel polymer and the first electrochromic layer is in contact with the gel polymer, and wherein there is substantially no contact between the first and second electrochromic layer; and
    sealing the layers between the first and second substrates wherein the device is substantially free of oxygen and moisture and substantially air and water tight.

31. The method of claim 29, wherein the first and second substrates are selected from glass, ceramic, plastic and combinations thereof.

32. The method of claim 27, the gel polymer further comprising a plasticizer wherein the plasticizer is from about 1% to about 70% by weight of the macromonomer.

33. The method of claim 31, further comprising the step of inserting in the gel polymer an inert spacer comprising beads selected from glass, vinyl, plastic, ceramic beads and combinations thereof.

* * * * *

UNITED STATES PATENT AND TRADEMARK OFFICE
CERTIFICATE OF CORRECTION

PATENT NO. : 7,626,748 B2  Page 1 of 1
APPLICATION NO. : 11/365125
DATED : December 1, 2009
INVENTOR(S) : Radmard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 366 days.

Signed and Sealed this

Second Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,626,748 B2 | Page 1 of 1 |
| APPLICATION NO. | : 11/365125 | |
| DATED | : December 1, 2009 | |
| INVENTOR(S) | : Bijan Radmard et al. | |

It is certified that error appears in the above-identified patent and that said Letters Patent is hereby corrected as shown below:

In column 1, between lines 13 and 15, insert the following new paragraph --This invention was made with Government support under Contract No. W909MY04-C-007 awarded by the U.S. Army. The Government has certain rights in this invention.--

Signed and Sealed this
Tenth Day of July, 2012

David J. Kappos
*Director of the United States Patent and Trademark Office*